(12) United States Patent
Golla et al.

(10) Patent No.: US 9,958,567 B2
(45) Date of Patent: May 1, 2018

(54) ROTATIONAL WELLBORE RANGING

(71) Applicant: Halliburton Energy Services, Inc., Houston, TX (US)

(72) Inventors: Christopher A. Golla, Houston, TX (US); Randal T. Beste, Houston, TX (US); Svetozar Simeonov, Houston, TX (US); Burkay Donderici, Houston, TX (US); Luis E. San Martin, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 118 days.

(21) Appl. No.: 14/392,301

(22) PCT Filed: Jul. 31, 2013

(86) PCT No.: PCT/US2013/053044
§ 371 (c)(1),
(2) Date: Dec. 23, 2015

(87) PCT Pub. No.: WO2015/016917
PCT Pub. Date: Feb. 5, 2015

(65) Prior Publication Data
US 2016/0216396 A1 Jul. 28, 2016

(51) Int. Cl.
*G01V 3/00* (2006.01)
*G01V 3/26* (2006.01)
(Continued)

(52) U.S. Cl.
CPC .......... *G01V 3/26* (2013.01); *E21B 47/02216* (2013.01); *E21B 47/0905* (2013.01)

(58) Field of Classification Search
CPC ... G01V 3/18; G01V 1/52; G01V 3/34; G01V 3/38; G01V 5/04
(Continued)

(56) References Cited

U.S. PATENT DOCUMENTS 3,605,920 A * 9/1971 Woodward .............. E21B 25/00
  175/239
4,639,674 A * 1/1987 Rippingale ............ G01V 3/081
  324/326
(Continued)

FOREIGN PATENT DOCUMENTS

| WO | 2009/014882 | 1/2009 |
| WO | 2009/128989 | 10/2009 |
| WO | 2012/067611 | 5/2012 |

OTHER PUBLICATIONS

Patent Examination Report No. 1 issued in Australian Application No. 2013395641 dated Apr. 6, 2016.
(Continued)

*Primary Examiner* — Giovanni Astacio-Oquendo
(74) *Attorney, Agent, or Firm* — Alan Bryson; Parker Justiss, P.C.

(57) ABSTRACT

In one example of rotational ranging in a wellbore in which a wellbore component having an axis of rotation is disposed, a wellbore ranging sensor is disposed on a circumferential area surrounding the axis of rotation. The sensor is moved on the circumferential area to multiple distinct sensing positions. At each sensing position, a magnetic field from another wellbore that is apart from the wellbore is measured resulting in multiple magnetic field measurements at the multiple distinct sensing positions. The multiple magnetic field measurements are provided to determine a position of the wellbore relative to the other wellbore using at least a subset of the multiple magnetic field measurements.

20 Claims, 4 Drawing Sheets

(51) Int. Cl.
*E21B 47/09* (2012.01)
*E21B 47/022* (2012.01)

(58) Field of Classification Search
USPC .......................... 324/346, 33, 334, 338, 339
See application file for complete search history.

(56) References Cited

U.S. PATENT DOCUMENTS

| | | |
|---|---|---|
| 7,027,926 B2 | 4/2006 | Haugland |
| 7,712,223 B2 | 5/2010 | Imamura et al. |
| 9,618,380 B2 * | 4/2017 | Suk .................... G01V 1/159 |
| 9,664,810 B2 * | 5/2017 | Mizuno ................ G01V 3/104 |
| 2008/0018334 A1 | 1/2008 | Reiderman |
| 2010/0332137 A1 | 12/2010 | Meadows et al. |
| 2011/0278067 A1 | 11/2011 | Clark |
| 2011/0308794 A1 | 12/2011 | Bittar et al. |

OTHER PUBLICATIONS

International Search Report/Written Opinion dated Apr. 15, 2014 by KIPO for PCT/US2013/053044, 12 pgs.

* cited by examiner

ROTATIONAL WELLBORE RANGING

TECHNICAL FIELD

The present disclosure relates to relative distance and azimuth measurements between wellbores formed in subsurface formation(s).

BACKGROUND

Wellbores formed in subterranean hydrocarbon reservoirs enable recovery of a portion of the hydrocarbons using production techniques. The hydrocarbons can adhere to the reservoirs, for example, due to a combination of capillary forces, adhesive forces, cohesive forces, and hydraulic forces. Steam-assisted gravity drainage (SAGD) is an example of an enhanced hydrocarbon recovery technique in which heated treatment fluids (for example, steam) can be applied to the formation to facilitate and enhance recovery of the hydrocarbons that are adhered to the formation. In an implementation of the SAGD technique, an injection wellbore can be formed adjacent to a production wellbore, and the heated treatment fluids can be injected through the injection wellbore into the formation surrounding the production wellbore. The heated fluids can decrease an adherence of the hydrocarbons to the formation, thereby releasing the hydrocarbons into the production wellbore.

While forming (for example, drilling) the injection wellbore, knowledge of a location of the production wellbore relative to the injection wellbore can be important. Traditional surveying techniques provide an estimate location for individual well bores. However, due to a large size of the cone of uncertainty associated with such measurement, a more accurate measurement is required in SAGD or similar applications. Ranging is an example of a method to control a position of a wellbore being drilled relative to an existing wellbore. In ranging, an electromagnetic field from the existing wellbore provides electromagnetic signals received by sensors in the wellbore being drilled. Several conditions, for example, wellbore drilling conditions, can adversely affect an ability of the electromagnetic sensors to sense the electromagnetic signals, and, consequently, affect ranging in the wellbores.

BRIEF DESCRIPTION OF THE DRAWINGS

Like reference numbers and designations in the various drawings indicate like elements.

DETAILED DESCRIPTION

Figure 1:
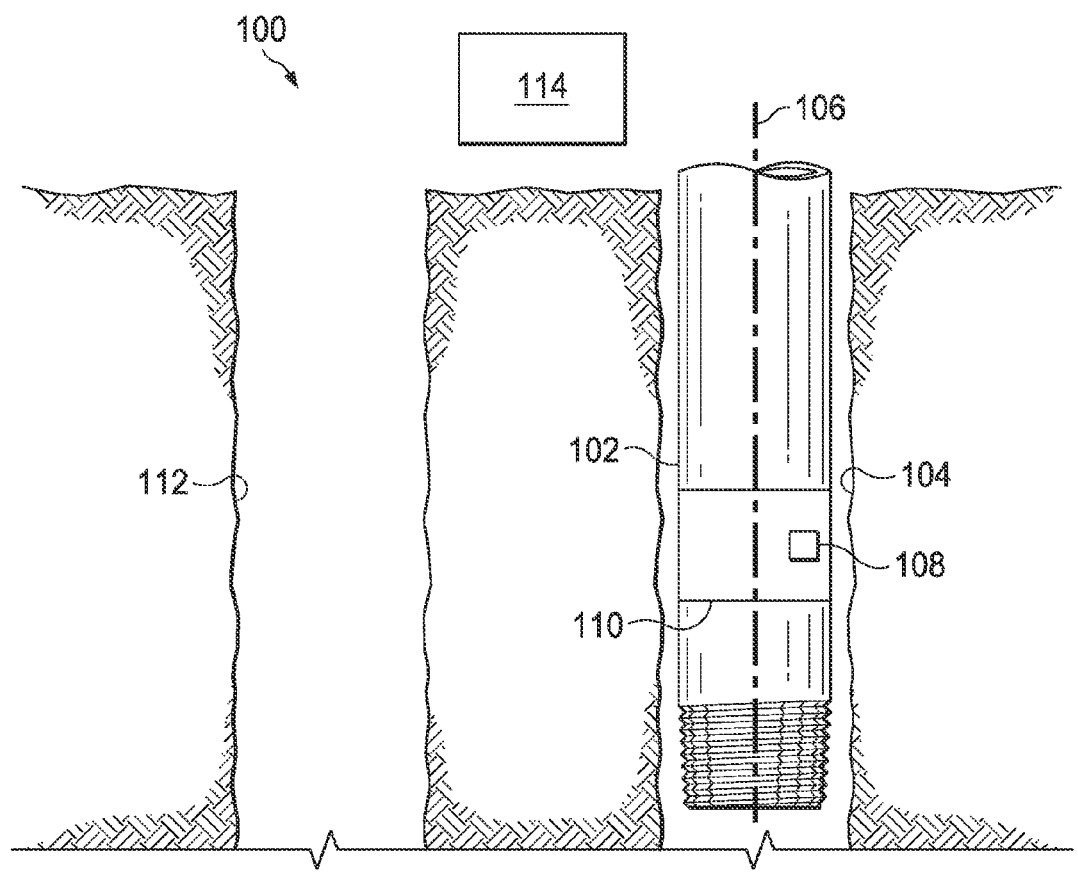
FIG. 1 illustrates an example wellbore system that includes wellbores for ranging.

The present disclosure relates to relative distance and azimuth measurements ("ranging") between wellbores formed in subsurface formation(s). More particularly, this disclosure relates to rotational wellbore ranging and associated methods. In the example of an SAGD application, precise ranging of the steam injection wellbore can be important. If the steam injection wellbore is too far from the production wellbore, the steam injection may not result in significant increased recovery. In another example of drilling a relief wellbore, if the relief wellbore intersects the production wellbore, a potentially hazardous condition such as a blowout can result from the pressure difference between the wells. Yet another example is a well intersection application where a wellbore is being drilled to intersect with and plug a blow out well. A ranging process can be used to determine the distance and precise location between a wellbore being drilled and an existing wellbore, and steer the well path based on the requirements of the application.

In some situations, the ranging process (or ranging) is implemented by affixing wellbore ranging sensors (e.g., electrodes, magnetometers, coils, or other suitable ranging sensors) to a rotary component (e.g., a drill string) of the wellbore being formed, e.g., the injector wellbore. An excitation signal (e.g., an electromagnetic signal) at a predetermined frequency can be transmitted into the formation in which the wellbore is being drilled. The wellbore ranging sensors receive and measure parameters of the excitation signal, based on which a position of another wellbore in the formation relative to the wellbore being formed can be determined. In situations in which the wellbore being formed is a relief well that is close to a target well in the formation, the excitation signal can be transmitted at higher frequencies to reduce the impact of skin effects.

This disclosure describes disposing a wellbore ranging sensor in or on a wellbore component in a first wellbore such that the sensor is offset from an axis of rotation of the wellbore component. In other words, the sensor is eccentric relative to a center of a rotational plane that is transverse to the axis of rotation of the wellbore component. As described below, the sensor is moved on a circumferential area surrounding the axis of rotation to multiple distinct sensing positions on the circumferential area. At each sensing position of the wellbore ranging sensor on the circumferential area, a magnetic field from a second wellbore that is apart from the first wellbore is measured resulting in multiple magnetic field measurements at the multiple distinct sensing positions. The multiple magnetic field measurements are provided to determine a position of the first wellbore relative to the second wellbore using at least a subset of the multiple magnetic field measurements. For example, the sensor can be moved to eight sensing positions on the circumferential area. The range estimation can be performed using between three and eight magnetic field measurements. Using the rotational magnetic field measurements obtained as described above, a position of the first wellbore relative to a second wellbore is determined.

Incrementally moving a sensor to distinct positions on a circumferential area on which the sensor is disposed (e.g., affixed) can enable performing magnetic field measurements using only one sensor. For example, the one sensor can be moved to multiple distinct positions on the circumferential area and be operated to determine absolute and gradient magnetic fields in the formation in which the two wellbores have been or are being formed. In this manner, a number of sensors needed for magnetic field measurements can be reduced from as high as four or eight sensors to one sensor. Similarly to the one sensor, multiple ranging sensors can also be disposed on the circumferential area and moved about the axis of rotation. Moreover, implementing the techniques described here can enable operating the wellbore ranging sensor to perform magnetic field measurements while rotating the wellbore component.

By having a single sensor, calibration can be simplified since sensitivity and offset errors are related to the one sensor. For the gradient-based magnetic field measurement or determination of direction, the sensitivity factor would cancel since a single sensor is used. In other words, such magnetic field measurements are based on the ratio of two sensor position measurements. Thus variation of the sensor's sensitivity due to environmental changes would not affect the magnetic field measurement. Calibration and corrections to environmental changes of one sensor can be easy relative to multiple sensors resulting in decrease in degradation of the accuracy of the magnetic field measurement.

FIG. 1 illustrates an example wellbore system 100 that includes wellbores for ranging. In some implementations, a wellbore component 102 (e.g., a cylindrical drill string) can be disposed in a first wellbore 104 (e.g., a SAGD wellbore). The wellbore component 102 can be operated to rotate about an axis of rotation 106 within the first wellbore 102. A wellbore ranging sensor 108 can be affixed to the wellbore component 102 such that a position of the sensor 108 is offset from the axis of rotation 106 of the wellbore component 102. In this arrangement, a physical position of the sensor 108 changes when the wellbore component 102 rotates as described below with reference to FIG. 3.

In some implementations, a housing 110 (e.g., a cylindrical housing) can be attached to the wellbore component 102 disposed in the first wellbore 104. For example, an axis of rotation of the housing 110 can be aligned with the axis of rotation 106 of the wellbore component 102. The wellbore ranging sensor 108 can be affixed to the housing 110. The housing 110 can be hollow and can be disposed on an outer circumference of the wellbore component 102. Alternatively, or in addition, the housing 110 can be a cylindrical length of a string connected serially to a length of the wellbore component 102. In some implementations, the housing 110 can remain substantially stationary relative to the wellbore component 102 when the wellbore component 102 rotates in the first wellbore 104, while in others, the housing 110 can rotate with the wellbore component 102 in the first wellbore 104.

The wellbore ranging sensor 108 can be moved to distinct sensing positions on the circumferential area surrounding the axis of rotation 106 of the wellbore component 102. At each distinct sensing position, the sensor 108 can be operated to perform magnetic field measurements and to provide the magnetic field measurements to a processing system 114 (e.g., a computer system). The processing system 114 can be operated to determine relative distance and azimuth measurements between the first wellbore 104 and a second wellbore 112 (e.g., a production wellbore or any target wellbore) using at least a subset of the magnetic field measurements provided by the sensor 108 at the distinct sensing positions. In some implementations, the processing system 114 can also be operated to transmit control signals that control the sensor 108 to perform the magnetic field measurements.

Figure 2A:
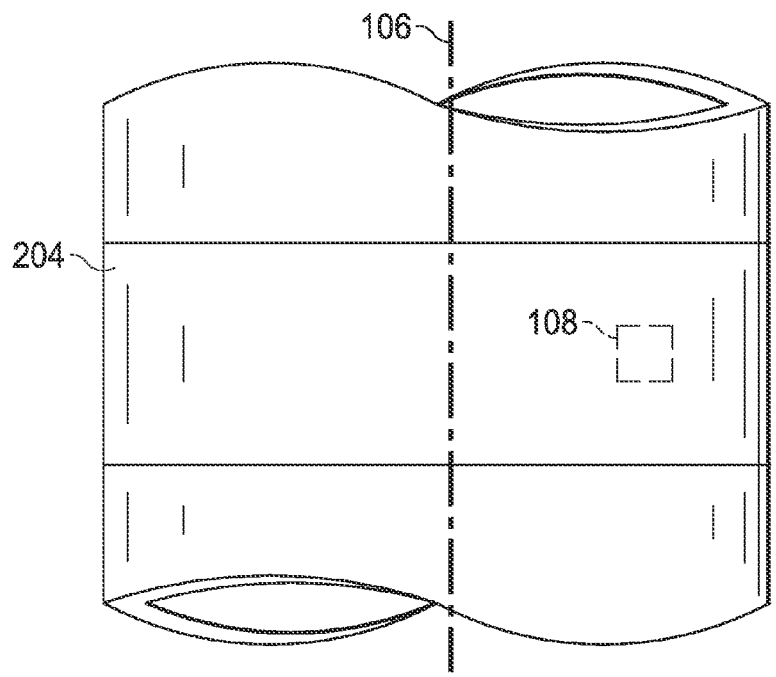
FIGS. 2A and 2B illustrate an example wellbore component having a circumferential area to which a wellbore ranging sensor is affixed.
Figure 2B:
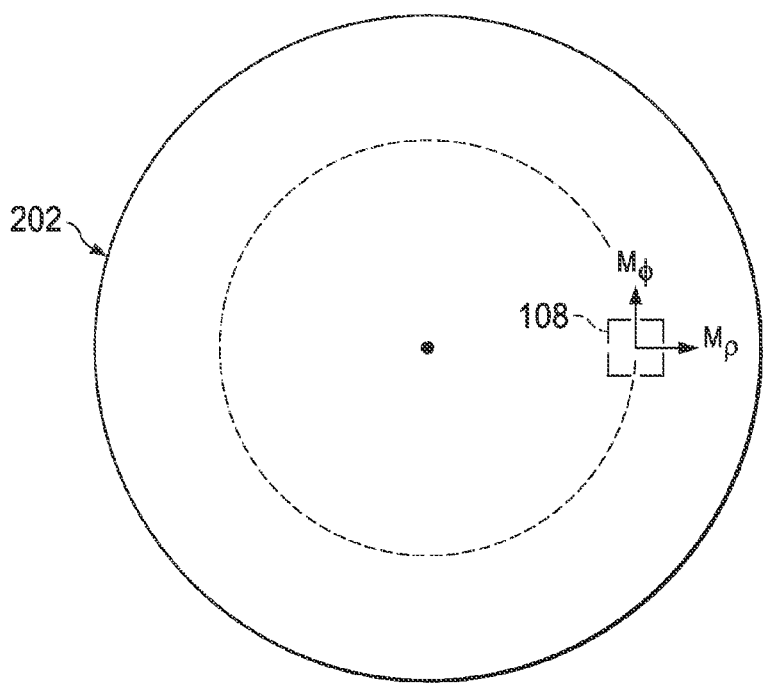

As described above, the wellbore ranging sensor 108 is eccentric relative to a center of a rotational plane 202 (FIGS. 2A, 2B) that is transverse to the axis of rotation 106 of the wellbore component 102. In some implementations, the circumferential area 204 surrounding the axis of rotation 106 can include, e.g., a cylindrical area on which the sensor 108 is disposed. For example, when the sensor 108 is disposed on a surface of a cylindrical wellbore component (e.g., a drill string), the circumferential area 204 surrounding the axis of rotation 106 is the cylindrical circumferential area of the wellbore component. In another example, when the sensor 108 is disposed on a surface of a cylindrical housing, the circumferential area 204 surrounding the axis of rotation 106 is included in the cylindrical circumferential area of the housing. In some implementations, the sensor 108 can be disposed on the plane 202 between the axis of rotation 106 and an outer surface of the wellbore component 102 or the housing 110 (FIG. 2B). In such implementations, the circumferential area 204 surrounding the axis of rotation 106 is the cylindrical circumferential area that the sensor 108 traverses when the wellbore component 102 rotates.

Multiple sensors can be placed at the same position with different orientations producing a multi-axial sensor. Both two-axis and three-axis sensors can be used. Multi-axis sensors are ideally orthogonal; however, they can also be placed non-orthogonal to each other. It is also possible to place multiple multi-axis sensors at different radial positions, different azimuthal positions or any combinations of the above.

To move the wellbore ranging sensor 108 to the distinct sensing positions on the circumferential area, the sensor 108 can be rotated about the axis of rotation 106 to each distinct sensing position. In some implementations, the sensor 108 can be rotated by rotating the wellbore component 102 about the axis of rotation 106. In other words, by affixing the sensor 108 to a surface of the wellbore component 102, the rotation of the wellbore component 102 during operation of the wellbore component 102 can be imparted to the sensor 108.

In implementations in which the sensor 108 is affixed to a housing 110, the sensor 108 can be rotated by rotating the housing 110 about the axis of rotation 106. For example, when the housing 110 is connected to the wellbore component 102, the rotation of the wellbore component 102 during operation of the wellbore component 102 can be imparted to the housing 110, and, by extension, to the sensor 108. In some implementations, a motor (not shown) or other suitable device can be connected to the housing 110 to rotate the housing 110 independently of the wellbore component 102. In such implementations, the sensor 108 can be rotated by operating the motor. By implementing a motor, such as a high-gear ratio motor, to rotate the housing 110 independently of the wellbore component 102, rotation of the housing 110 and the sensor 108 can be precisely controlled. For example, the excitation frequencies and the rotation of the housing 110 can be coordinated for clearer magnetic field measurements. Moreover, instead of constantly rotating the sensor 108, the sensor 108 can be rotated incrementally, with the magnetic field measurements at any given time being taken while the sensor 108 is rotationally stationary.

The sensor 108 can be rotated as described above to the multiple distinct sensing positions, and, at each distinct sensing position, operated to perform magnetic field measurements. The sensor 108 can be stationary at a sensing position when performing the magnetic field measurements at the sensing position or can be moving (e.g., rotating) while performing the magnetic field measurements. The multiple magnetic field measurements can be collected and provided to the processing system 114, which can process the magnetic field measurements to determine a range of the second wellbore 112 relative to the first wellbore 104. To do so, the processing system 114 can divide the rotational plane 202 into multiple segments (or bins) and associate magnetic field measurements taken at the distinct sensing positions with the multiple segments.

Figure 3:
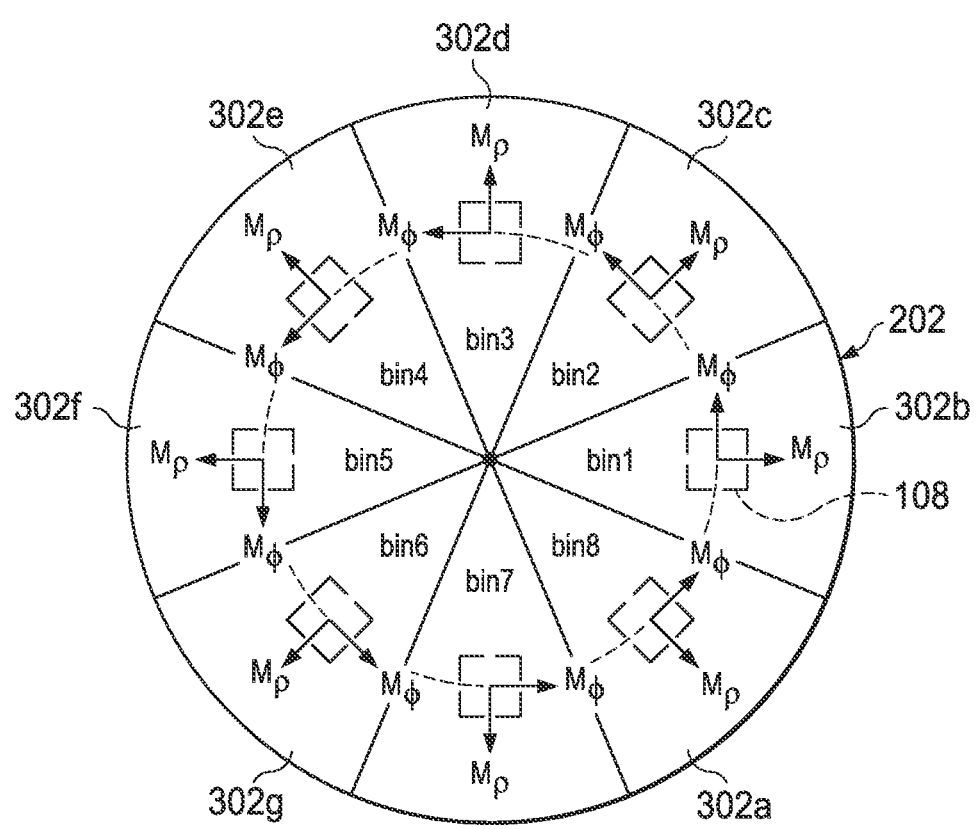
FIG. 3 illustrates an example of a rotational plane that has been divided into multiple bins.

FIG. 3 illustrates an example of a rotational plane 202 that has been divided into multiple bins. In some implementations, the processing system 114 can identify the rotational plane 202 on the wellbore component 102 as the plane that is transverse to the axis of rotation 106 of the wellbore component 102, the plane on which the sensor 108 is disposed, and the plane that includes the multiple distinct sensing positions. For example, the processing system 114 can identify any two-dimensional plane within the circumferential area 204 as the rotational plane 202.

The processing system 114 can divide the rotational plane 202 into multiple segments (e.g., segments 302a-302h). Each segment can include at least one distinct sensing position of the multiple distinct sensing positions. In other words, the sensor 108 can be have been positioned at one or more distinct positions within each segment, and, at each of the one or more distinct positions, the sensor 108 can have been operated to perform magnetic field measurements. The processing system 114 can determine that a distinct sensing position at which a magnetic field measurement was made is included in a segment of the multiple segments. For example, the processing system 114 can determine that a sensing position is included in a first segment 302a. The processing system 114 can responsively associate the magnetic field measurement with the first segment 302a. In this manner, the processing system 114 can associate each magnetic field measurement performed at each distinct, sensing position to a segment of the multiple segments into which the rotational plane 202 is divided. Determination of the sensing position can be performed by measuring the tool face azimuth and housing azimuth relative to the tool face electromechanically, and adding these two to each other. Alternatively, it can directly be measured by utilizing gravimeters or magnetometers that measure earth's magnetic field.

The ranging sensors can also perform as such magnetometers. For example, the sensor 108 can be an eccentric monopole or dipole sensor that includes multiple elements with different orientations. Each segment corresponds to a different position and orientation for the sensor 108. Consequently, the multiple segments represent a synthetic array of antenna elements that can be used to determine absolute or gradient magnetic fields by taking differently weighted combinations of different elements. In the case of multi-axial dipole antennas, the processing system 114 can add synthetic antenna elements at opposite segments and in azimuthal direction to obtain the gradient field. The processing system 114 can subtract the signals in the same case to obtain the absolute signal.

In implementations in which a motor is connected to a housing 110 to which the sensor 108 is affixed, the processing system 114 can be connected to the motor. The processing system 114 can identify a segment of the multiple segments into which the rotational plane 202 is divided, e.g., the segment 302b. The processing system 114 can transmit control signals to the motor and operate the motor to move the sensor 108 to a position within the segment 302b. At this position, the processing system 114 can operate the sensor 108 to perform magnetic field measurements. The processing system 114 can associate the magnetic field measurements made at the position to which the sensor 108 was moved with the segment 302b that includes the position.

In some implementations, the wellbore system 100 can include a position sensor (not shown) disposed on the circumferential area in proximity to the sensor 108. The processing system 114 can be connected to and can operate the position sensor. The processing system 114 can receive, from the position sensor, position signals indicating a position of the position sensor on the circumferential area. The processing system 114 can store data that identifies a position of the sensor 108 relative to the position sensor. Based on the position signals received from the position sensor and on the data that identifies the position of the sensor 108 relative to the position sensor, the processing system 114 can determine the distinct sensing position in which the magnetic field measurement was made, and associate the distinct sensing position with a segment of the multiple segments.

In some implementations, the processing system 114 can determine that a distinct sensing position in which a magnetic field measurement was made is included in a segment based on the magnetic field measurement made by the sensor 108 at the distinct sensing position. For example, by inspecting lower frequencies (e.g., 1-10 Hz) of the excitation signal, the processing system 114 can obtain the earth's magnetic field from the magnetic field measurements performed at the distinct sensing position, and, from this data, determine a segment in which the distinct sensing position is included.

The processing system 114 can determine the range of the first wellbore 104 relative to the second wellbore 112 using at least one or more magnetic field measurements associated with each segment of the multiple segments. For example, the processing system 114 can perform statistical operations on the magnetic field measurements associated with each segment (e.g., determine an average) to arrive at the single magnetic field measurement, and determine the position of the second wellbore 114 based on the single magnetic field measurement. Alternatively, the processing system 114 can determine the position of the second wellbore 112 using all or a subset of all the magnetic field measurements associated with each segment. By implementing such a bin configuration, the processing system 114 can increase the azimuthal information provided by ranging sensors and provide a clearer directional location of the second wellbore 112.

In some implementations, the processing system 114 can use the rotating housing 110 in conjunction with the segment (or bin) configuration described above to collect azimuthal information. Alternatively, or in addition, the wellbore system 100 can include a separate resolver circuit (not shown) that is connected to the processing system 114. By implementing the resolver circuit, the processing system 114 can actively identify magnetic maximums and minimums to determine the direction of the second wellbore 112. For example, the processing system 114 can rotate the housing 110 and operate the sensor 108 to take discrete measurements at different rotational positions. The processing system 114 can rotate the housing 110 to adjust the rotational position of the sensor 108 according to measurements received at previous distinct positions. The resolver circuit can iteratively adjust the position of the sensor 108 until a maximum measurement is located, identifying a direction of the second wellbore 112. In this manner, an incremental rotation/iterative approach can be implemented to decrease an amount of rotation required to identify target wells, e.g., the second wellbore 112.

In some implementations, a wellbore ranging transmitter (e.g., magnets, strong electric dipoles, electrodes, or other suitable transmitters) disposed on the circumferential area of the wellbore component 102 in the first wellbore 104 can be moved to multiple distinct transmitting positions on the circumferential area. Similarly to the sensor 108, at each position of the transmitter, the transmitter can transmit signals to the second wellbore 112 from the first wellbore 104 resulting in multiple ranging transmissions at the multiple distinct transmitting positions. The multiple ranging transmissions can be provided, e.g., to the processing system 114, which can determine the range of the first wellbore 104 relative to the second wellbore 112 using the multiple magnetic field measurements and the multiple ranging transmissions.

For example, the wellbore ranging transmitter can be placed in separate housings, each connected to the wellbore component 102. The sensor 108 and the transmitter can be rotated to distinct positions perform the magnetic field measurements and the transmitting, respectively. In some implementations, the sensor 108 and the transmitter can be rotated at the same rotational frequency, while, in others, the sensor 108 and the transmitter can be rotated at different rotational frequencies. Rotating at different rotational frequencies can produce two-dimensional segments (or bins) in which the first dimension is the transmitter segment and the second dimension is the receiver segment. In general, only a portion of the two-dimensional segments can be used for ranging the second wellbore 112. In some implementations, a distinct sensing position of the sensor 108 and a distinct transmitting position of the transmitter at which an optimum, e.g., maximum, ranging signal is received from the second wellbore 112 can be determined based on rotating the sensor 108 and the transmitter at the different rotational frequencies.

Rotating the sensor 108 and the transmitter at different rotational frequencies can include keeping the sensor 108 stationary and rotating the transmitter, or vice versa. Such rotation can also include rotating the sensor 108 and the transmitter in opposite directions at the same or different rotational speeds. To do so, each of the sensor 108 and the transmitter can be operated by the same or respective motors, e.g., counter-rotation motors. In some implementations, the sensor 108 or the transmitter or both can be rotated at a natural frequency of ration associated with the wellbore component 102. When rotating the sensor 108 or the transmitter or both independently from the wellbore component 102, the earth magnetic field may be minimally disturbed to reduce noise in the measurement.

Figure 4:
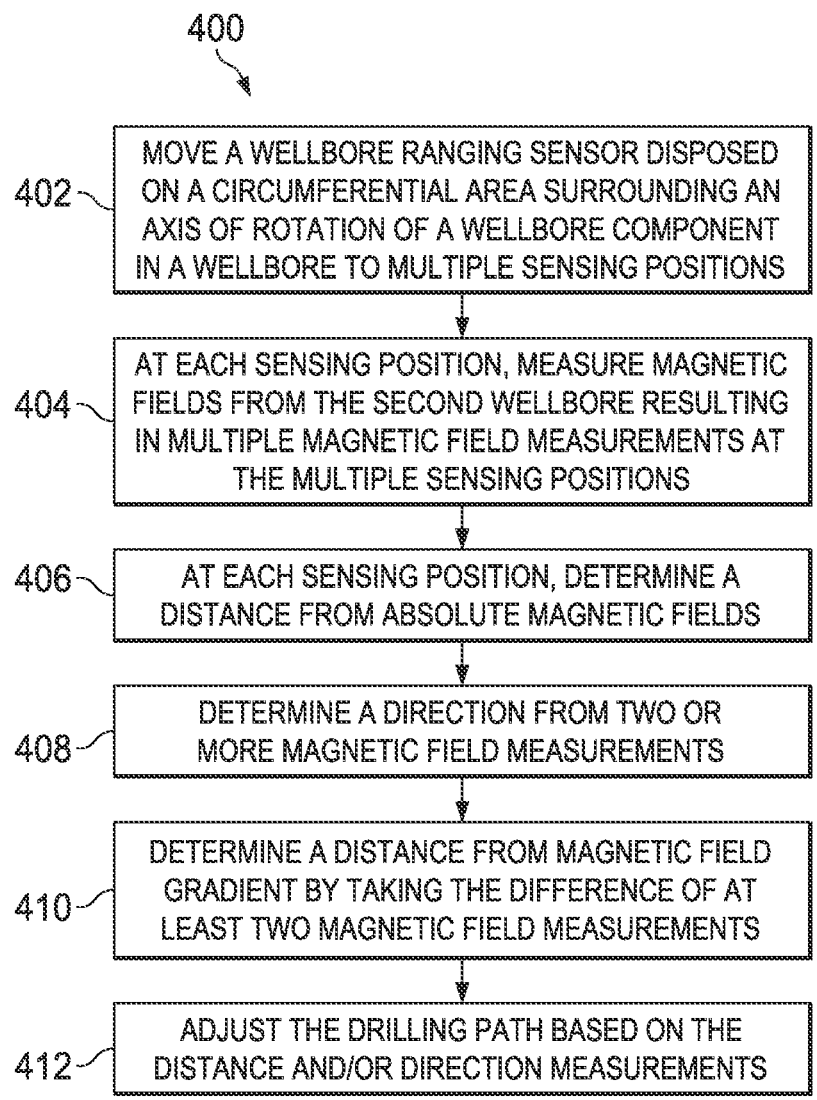
FIG. 4 is a flowchart of an example process for rotational wellbore ranging.

FIG. 4 is a flowchart of an example process 400 for rotational wellbore ranging. At 402, a wellbore ranging sensor disposed on the circumferential area can be moved to multiple distinct sensing positions. At 404, magnetic fields from the second wellbore can be measured from each sensing position, resulting in multiple magnetic field measurements at the multiple sensing positions. At 406, a distance from absolute magnetic fields can be determined at each sensing position. At 408, a direction from two or more magnetic field measurements is determined. At 410, a distance from magnetic field gradient is determined by taking the difference of at least two magnetic field measurements. At 412, the drilling path is adjusted based on the distance and/or direction measurements.

The direction to second wellbore can be calculated from the direction of the magnetic field vector at or around the position of the housing by rotating the magnetic field direction by 90 degrees. The direction can, alternatively, be calculated from the gradient of the magnetic field similarly. The distance can be calculated from the magnetic field amplitude from the formula $r=1/(2 \cdot \pi \cdot H)$, where r is the distance to second well, and H is the magnetic field amplitude. The distance can also be calculated by taking a ratio of the absolute magnetic field to the gradient magnetic field. Calculation of distance and direction by utilizing absolute and gradient fields can be performed using known techniques.

In some implementations, more than one sensor can be implemented to perform the magnetic field measurements. For example, by affixing two sensors to diametrically opposite positions on the circumferential area of the wellbore component 102, and rotating the two sensors to distinct sensing positions to perform respective magnetic field measurements, a better gradient measurement and directional determination can be achieved. Similarly, more than one transmitter can be implemented.

The processing system 114 can be a computer system, e.g., a desktop computer, a laptop computer, a tablet computer, a smartphone, a personal digital assistant, or any other suitable computer system. The processing system 114 can include a computer-readable medium storing instructions executable by a data processing apparatus to perform operations described here. Alternatively, or in addition, the processing system 114 can be implemented as firmware, hardware, or combinations of them. In some implementations, the processing system 114 can include processing circuitry operable to perform the operations described here.

A number of implementations have been described. Nevertheless, it will be understood that various modifications may be made without departing from the spirit and scope of the disclosure.

The invention claimed is:

1. A method for ranging in wellbores, the method comprising:
in a first wellbore in which a wellbore component having an axis of rotation is disposed, moving a wellbore ranging sensor disposed on a circumferential area surrounding the axis of rotation to a plurality of distinct sensing positions on the circumferential area;
at each sensing position of the wellbore ranging sensor on the circumferential area, measuring a magnetic field from a second wellbore that is apart from the first wellbore resulting in a plurality of magnetic field measurements at the plurality of distinct sensing positions; and
providing the plurality of magnetic field measurements to determine a position of the first wellbore relative to the second wellbore using at least a subset of the plurality of magnetic field measurements.

2. The method of claim 1, wherein moving the wellbore ranging sensor to the plurality of distinct sensing positions on the circumferential area comprises rotating the wellbore ranging sensor about the axis of rotation to each of the plurality of distinct sensing positions.

3. The method of claim 2, wherein rotating the wellbore ranging sensor about the axis of rotation to each of the plurality of distinct sensing positions comprises rotating the wellbore component about the axis of rotation.

4. The method of claim 2, wherein rotating the wellbore ranging sensor about the axis of rotation to each of the plurality of distinct sensing positions comprises:
disposing the wellbore ranging sensor on a housing connected to the wellbore component; and
rotating the housing about the axis of rotation to each of the plurality of distinct sensing positions.

5. The method of claim 1, further comprising:
identifying a rotational plane on the wellbore component, wherein the sensor is disposed on the rotational plane, wherein the rotational plane is transverse to the axis of rotation of the wellbore component, and wherein the plurality of distinct sensing positions are included in the rotational plane;
dividing the rotational plane into a plurality of segments, each segment including at least one distinct sensing position of the plurality of distinct sensing positions;

determining that a distinct sensing position at which a magnetic field measurement was made is included in a segment of the plurality of segments;

associating the magnetic field measurement with the segment in response to determining that the distinct sensing position at which the magnetic field measurement was made is included in the segment of the plurality of segments; and determining the position of the first wellbore relative to the second wellbore using at least one or more magnetic field measurements associated with each segment of the plurality of segments.

6. The method of claim 5, wherein determining that the distinct sensing position in which the magnetic field measurement was made is included in the segment of the plurality of segments comprises:

identifying the segment;

moving the wellbore ranging sensor to a position within the segment; and designating the position to which the wellbore ranging sensor is moved as the distinct sensing position.

7. The method of claim 5, wherein determining that the distinct sensing position in which the magnetic field measurement was made is included in the segment of the plurality of segments comprises:

receiving, from a position sensor disposed on the circumferential area in proximity to the wellbore ranging sensor, position signals indicating a position of the position sensor on the circumferential area; and determining the distinct sensing position in which the magnetic field measurement was made using at least the position signals and a position of the wellbore ranging sensor relative to the position sensor.

8. The method of claim 5, wherein determining that the distinct sensing position in which the magnetic field measurement was made is included in the segment of the plurality of segments comprises determining the distinct sensing position based on the magnetic field measurement made at the distinct sensing position.

9. The method of claim 1, wherein, at each distinct sensing position of the wellbore ranging sensor on the circumferential area, measuring a magnetic field from second wellbore that is apart from the first wellbore comprises measuring the magnetic field while the wellbore ranging sensor is moving.

10. The method of claim 1, further comprising determining the position of the first wellbore relative to the second wellbore by:

identifying a first magnetic field measurement made at a first distinct sensing position;

identifying a magnetic field measurement made at a second distinct sensing position; and determining a gradient based on the first magnetic field measurement and the second magnetic field measurement.

11. The method of claim 1, further comprising:

in the first wellbore, moving a wellbore ranging transmitter disposed on the circumferential area to a plurality of distinct transmitting positions on the circumferential area;

at each position of the wellbore ranging transmitter on the circumferential area, transmitting signals to the second wellbore from the first wellbore resulting in a plurality of ranging transmissions at the plurality of distinct transmitting positions; and providing the plurality of ranging transmissions to determine the range of the first wellbore relative to the second wellbore using at least a subset of the plurality of magnetic field measurements and the subset of the plurality of magnetic field transmissions.

12. The method of claim 11, wherein moving the wellbore ranging sensor and moving the wellbore ranging transmitter comprises rotating the wellbore ranging sensor and rotating the wellbore ranging transmitter, respectively, and wherein the method further comprises rotating the wellbore ranging sensor at a different rotational frequency relative to the wellbore ranging transmitter.

13. The method of claim 12, further comprising identifying a distinct sensing position of the wellbore ranging sensor and a distinct transmitting position of the wellbore transmitter at which a maximum ranging signal is received from the second wellbore based on rotating the wellbore ranging sensor at the different rotational frequency relative to the wellbore ranging transmitter.

14. A system comprising:

processing circuitry; and a non-transitory computer-readable medium storing instructions executable by the processing circuitry to perform operations comprising:

in a first wellbore in which a wellbore component having an axis of rotation is disposed, moving a wellbore ranging sensor disposed on a circumferential area surrounding the axis of rotation to a plurality of distinct sensing positions on the circumferential area;

at each sensing position of the wellbore ranging sensor on the circumferential area, measuring a magnetic field from a second wellbore that is apart from the first wellbore resulting in a plurality of magnetic field measurements at the plurality of distinct sensing positions; and providing the plurality of magnetic field measurements to determine a position of the first wellbore relative to the second wellbore using at least a subset of the plurality of magnetic field measurements.

15. The system of claim 14, wherein moving the wellbore ranging sensor to the plurality of distinct sensing positions on the circumferential area comprises rotating the wellbore ranging sensor about the axis of rotation to each of the plurality of distinct sensing positions.

16. The system of claim 15, wherein rotating the wellbore ranging sensor about the axis of rotation to each of the plurality of distinct sensing positions comprises rotating the wellbore component about the axis of rotation.

17. The system of claim 15, wherein rotating the wellbore ranging sensor about the axis of rotation to each of the plurality of distinct sensing positions comprises:

disposing the wellbore ranging sensor on a housing connected to the wellbore component; and rotating the housing about the axis of rotation to each of the plurality of distinct sensing positions.

18. The system of claim 14, the operations further comprising:

identifying a rotational plane on the wellbore component, wherein the sensor is disposed on the rotational plane, wherein the rotational plane is transverse to the axis of rotation of the wellbore component, and wherein the plurality of distinct sensing positions are included in the rotational plane;

dividing the rotational plane into a plurality of segments, each segment including at least one distinct sensing position of the plurality of distinct sensing positions;

determining that a distinct sensing position at which a magnetic field measurement was made is included in a segment of the plurality of segments;

associating the magnetic field measurement with the segment in response to determining that the distinct sensing position at which the magnetic field measurement was made is included in the segment of the plurality of segments; and determining the position of the first wellbore relative to the second wellbore using at least one or more magnetic field measurements associated with each segment of the plurality of segments.

19. A system comprising:

a wellbore ranging sensor to be disposed on a circumference of a wellbore component operable to rotate about an axis of rotation in a first wellbore;

a wellbore ranging transmitter to be disposed on the circumference of the wellbore component; and a controller operable to perform operations comprising:

rotating the wellbore ranging sensor disposed on the circumference about the axis of rotation to a plurality of distinct sensing positions on the circumference;

at each sensing position of the wellbore ranging sensor on the circumference, measuring a magnetic field from a second wellbore that is apart from the first wellbore resulting in a plurality of magnetic field measurements at the plurality of distinct sensing positions;

rotating the wellbore ranging transmitter disposed on the circumference about the axis of rotation to a plurality of distinct transmitting positions on the circumference;

at each transmitting position of the wellbore ranging transmitter on the circumference, transmitting signals to the second wellbore from the first wellbore resulting in a plurality of ranging transmissions at the plurality of distinct transmitting positions; and determining a position of the first wellbore relative to the second wellbore using at least a subset of the plurality of magnetic field measurements and a subset of the plurality of ranging transmissions.

20. The system of claim 19, wherein the operations that the controller is operable to perform further comprise:

identifying a first rotational plane on the wellbore component, wherein the sensor is disposed on the first rotational plane, wherein the first rotational plane is transverse to the axis of rotation of the wellbore component, and wherein the plurality of distinct sensing positions are included in the first rotational plane;

identifying a second rotational plane on the wellbore component, wherein the transmitter is disposed on the second rotational plane, wherein the second rotational plane is transverse to the axis of rotation of the wellbore component, and wherein the plurality of distinct transmitting positions are included in the second rotational plane;

dividing the first rotational plane into a plurality of first segments, each first segment including at least one distinct sensing position of the plurality of distinct sensing positions;

dividing the second rotational plane into a plurality of second segments, each second segment including at least one distinct transmitting position of the plurality of distinct transmitting positions;

determining that a distinct sensing position at which a magnetic field measurement was made is included in a first segment of the plurality of first segments;

determining that a distinct transmitting position at which transmitting signals were transmitted is included in a second segment of the plurality of second segments;

associating the magnetic field measurement with the segment in response to determining that the distinct sensing position at which the magnetic field measurement was made is included in the segment of the plurality of segments; and determining the position of the first wellbore relative to the second wellbore using at least one or more magnetic field measurements associated with each first segment of the plurality of first segments and using at least one or more transmitting signals associated with each second segment of the plurality of second segments.

* * * * *